US008376710B2

(12) United States Patent
Gerber et al.

(10) Patent No.: US 8,376,710 B2

(45) Date of Patent: Feb. 19, 2013

(54) AIRFOILS WITH VIBRATION DAMPING SYSTEM

(75) Inventors: Christoph Gerber, Rheinfelden (CH); Markus Denk, Dietikon (CH); Pierre-Alain Masserey, Wuerenlos (CH); Jacob Laborenz, Hannover (DE); Christian Siewert, Hannover (DE)

(73) Assignee: Alstom Technology Ltd., Baden (CH)

( * ) Notice: Subject to any disclaimer, the term of this patent is extended or adjusted under 35 U.S.C. 154(b) by 468 days.

(21) Appl. No.: 12/775,804

(22) Filed: May 7, 2010

(65) Prior Publication Data

US 2010/0290893 A1 Nov. 18, 2010

(30) Foreign Application Priority Data

May 12, 2009 (EP) .................................... 09160063

(51) Int. Cl.
*B64C 11/16* (2006.01)

(52) U.S. Cl. ....................................................... 416/190

(58) Field of Classification Search .................. 415/119; 416/500, 190
See application file for complete search history.

(56) References Cited

U.S. PATENT DOCUMENTS

| | | | | |
|---|---|---|---|---|
| 4,722,668 | A * | 2/1988 | Novacek | 416/190 |
| 5,695,323 | A * | 12/1997 | Pfeifer et al. | 416/190 |
| 5,709,527 | A | 1/1998 | Ernst et al. | |
| 7,399,158 | B2 | 7/2008 | Care et al. | |

FOREIGN PATENT DOCUMENTS

| | | |
|---|---|---|
| DE | 195 05 389 A1 | 8/1996 |
| DE | 199 37 146 A1 | 2/2001 |

OTHER PUBLICATIONS

European Search Report dated Aug. 27, 2009.

* cited by examiner

*Primary Examiner* — Edward Look
*Assistant Examiner* — Juan G Flores
(74) *Attorney, Agent, or Firm* — Buchanan Ingersoll & Rooney PC

(57) ABSTRACT

The disclosure relates to adjacently mounted circumferentially distributed turbo machine airfoils with a vibration damping system. Each adjacent pair of airfoils includes a fixing and receiving portion, extending between the paired adjacent airfoils, each with a face that are proximal (e.g., in contact with) each other. Vibration can be suppressed by the fixing and receiving portions each having a received magnet fixingly installed therein and a non-magnetic conducting plate therebetween. Each magnet has a pole that faces the pole of the other magnet in between which the non-magnetic conducting plate is located and in which eddy currents can be induced by the relative movement of the magnets due to vibration.

14 Claims, 3 Drawing Sheets

AIRFOILS WITH VIBRATION DAMPING SYSTEM

RELATED APPLICATIONS

This application claims priority under 35 U.S.C. §119 to European Patent Application No. 09160063.5 filed in Europe on May 12, 2009, the entire content of which is hereby incorporated by reference in its entirety.

FIELD

The disclosure relates to vibration damping of turbo machine airfoils, and to the use of magnetic fields to damp airfoil vibration.

BACKGROUND INFORMATION

Turbo machine airfoils can be subject to high static and dynamic loads due to thermal and centrifugal loads as well as dynamic excitation forces. The resulting vibration amplitudes, in combination with the high static loads, can lead to high cycle fatigue failures. Thus, the damping of vibration can be of great importance.

One way to address this problem is to install frictional coupling devices, such as under platform-dampers, lacing wires or tip shrouds that provide damping through energy dissipation by frictional contact. This approach can be disadvantageous due to design complexity because physical contact parameters can be difficult to evaluate and change under operating conditions. Furthermore, the coupling of the airfoils and the geometric properties of friction damping devices can change dynamic characteristics such as eigenfrequency and mode shape.

An alternative can be to use the attractive force of magnets for damping. U.S. Pat. No. 4,722,668, for example, discloses the use of magnets in both the shroud and at half airfoil height. The magnets are paired, so that the magnet of one airfoil abuts a magnet fitted in an adjacent airfoil.

As an alternative, eddy currents induced by movement of an electrical conductor in a magnetic field can provide an alternative with a different damping capability. This solution uses the principle that the movement of an electrical conductor in a magnetic field induces a voltage, which in turn creates eddy currents. The magnetic field of the eddy currents opposes that of the first magnetic field. This exerts a force on a metal plate causing it to resist movement while transforming kinetic energy of a conductor plate into heat.

DE 195 05 389 A1 for example, discloses an eddy current damping arrangement for a turbo machine in which a magnetic ring is located in a wall of a turbo-machine such that the vibration of rotating airfoils, which are equipped with an electric conductor, can be suppressed when passing the ring.

U.S. Pat. No. 7,399,158 B2 discloses another eddy current damping system applied to an array of airfoils mounted for rotation about a central axis. The damping arrangement includes a current carrying conductor that can form a loop around the array of airfoils.

Both of these arrangements involve the installation of a magnetic ring, or ring shaped current carrying loop for inducing a magnetic field, that is separate from the airfoils. As an alternative, DE 199 37 146 A1 discloses adjacent airfoils with paired wings having ends in close proximity to each other. The end of one wing has a mounted magnet while the end of its paired opposite has a copper or aluminium plate. By these features the relative movement of the wing end can be suppressed by the eddy current principle.

Unlike vibration suppression systems that use magnetic attraction, vibration damping by eddy currents involves some relative movement without which eddy currents will not be formed. All of the foregoing documents are incorporated herein by reference in their entireties.

SUMMARY

A vibration damping system is disclosed for adjacently mounted circumferential distributed turbo machine airfoils, the system comprising: a first fixing and receiving portion, configured to extend from a first airfoil to an end defining a first face; a second fixing and receiving portion configured to extend towards the first fixing and receiving portion to establish an end defining a second face proximal with the first face of the first fixing and receiving portion; a first magnet, fixed in the first fixing and receiving portion and arranged such that a pole faces towards the first face of the first fixing and receiving portion; a first non-magnetic conducting plate mounted between the first face and the first magnet; and a second magnet, fixed in the second fixing and receiving portion and arranged such that a pole which faces the second face is aligned with, and separated by a separation distance from the pole of the first magnet.

A turbo machine is disclosed comprising: a first airfoil and a second airfoil; and a vibration damping system which includes: a first fixing and receiving portion, configured to extend from within the first airfoil to an end defining a first face; a second fixing and receiving portion configured to extend from within the second airfoil towards the first fixing and receiving portion to establish an end defining a second face proximal with the first face of the first fixing and receiving portion; a first magnet, fixed in the first fixing and receiving portion and arranged such that a pole faces towards the first face of the first fixing and receiving portion; a first non-magnetic conducting plate mounted between the first face and the first magnet; and a second magnet, fixed in the second fixing and receiving portion and arranged such that a pole which faces the second face is aligned with, and separated by a separation distance from the pole of the first magnet.

BRIEF DESCRIPTION OF THE DRAWINGS

Exemplary embodiments are disclosed more fully hereinafter with reference to the accompanying drawings, wherein.

Figure 1:
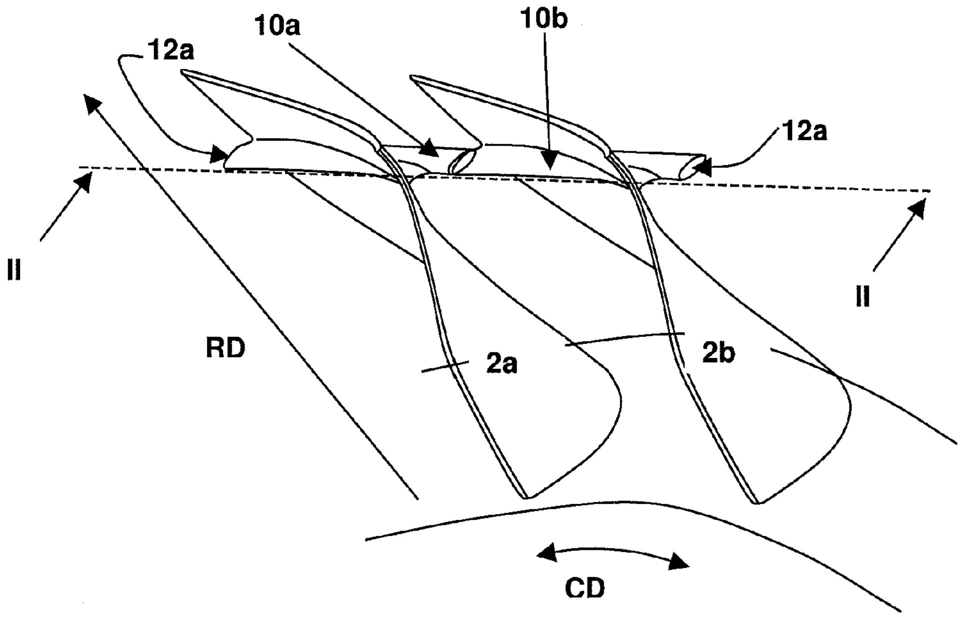
FIG. 1 is a perspective view of an exemplary pair of circumferentially mounted adjacent airfoils of a turbo machine according to an exemplary embodiment.

Other aspects and advantages of the disclosure will become apparent from the following description, taken in connection with the accompanying drawings wherein by way of illustration, exemplary embodiments of the disclosure are disclosed.

DETAILED DESCRIPTION

An exemplary damping device for attenuation of vibration of airfoils, can be fitted in a turbo-machine, across a broad range of vibration frequencies.

Adjacently mounted circumferential distributed turbo machine airfoils, as disclosed herein, include an exemplary vibration damping system. Each adjacent pair of airfoils can include a fixing and receiving portion on each airfoil. One extends from the first airfoil to an end defining a face, which can be substantially perpendicular to the direction of extension. The other portion extends towards the first fixing and receiving portion to a face that is proximal or in contact with the face of the first fixing and receiving portion. The first portion has a first magnet, fixingly received in the first portion, with a pole facing towards the first face of the first portion and a first non-magnetic conducting plate fixingly mounted between the first face and the first magnet. The second portion has a second magnet, fixingly received in the second portion, with a pole facing the second face such that the pole can be aligned with and separated, by a separation distance, from the pole of the first magnet.

The combination of paired magnets and a non-magnetic conducting plate can provide higher damping capacities across a wider range of frequencies due, in part, to stronger and better aligned magnetic fields.

In damping aspects with one magnet in one fixing portion, flux lines form lines perpendicular to the face of the opposed wing resulting in a very low radial magnet field component. When two magnets face each other with unlike poles, the alignment of the flux lines are qualitatively the same but with a higher magnitude resulting in higher damping force. In both cases an attractive force, between magnets and the metallic portions and/or between the magnets, is present, resulting in an unstable equilibrium created when the attractive force acting on both ends of the portions have the same magnitude. If a blade deflects to one side, the forces on a side with a smaller air gap increases whereas on a side with a bigger air gap, the force decreases. This imbalance causes unstable motion. By aligning the magnets so that like poles face each other, it was found that a more stable equilibrium can be achieved. Also, the radial magnetic flux component created between like poles was found to create an even large damping force. In an exemplary embodiment the facing poles of magnets in the receiving and fixing portions have the same polarity, for example N-N or S-S.

In another exemplary embodiment, the second portion also has a non-magnetic conducting plate. The non-magnetic conducting plate can be fixingly mounted between the second magnet and the second face. By having a non-magnetic conducting plate in both portions, the eddy current damping mechanism, for the same relative movement of the two portions, can be enhanced.

In another exemplary embodiment of the system, a distance of between 1 mm and 5 mm, or more or less, separates the magnets of the two portions.

FIG. 1 shows only two of a series of adjacently mounted circumferential distributed turbo machine airfoils 2*a*, 2*b*. The two shown airfoils 2*a*, 2*b*, which are paired by being adjacent to one another, are fitted with an exemplary vibration damping system. The adjacent airfoils 2*a*, 2*b* each have portions 10*a*,10*b* mounted on the respective airfoils 2*a*, 2*b* that extend from the airfoils 2*a*,2*b*, in one exemplary embodiment, substantially in the circumferential direction CD. In another exemplary embodiment, adjacent airfoils 2*a*, 2*b* each have portions 10*a*, 10*b* mounted on the respective airfoils 2*a*, 2*b* that extend from airfoils 2*a*, 2*b* in a direction substantially offset from the circumferential direction CD. The different extensions can provide different damping characteristics. The extension of the portions 10*a*, 10*b* cause them to span the space between the airfoils 2*a*, 2*b* such that an end of the portions 10*a*, 10*b* either comes in contact with or ends in close proximity to each other at faces 12*a*, 12*b*. An important characteristic is that the portions 10*a*, 10*b* are able to move relative to each other. If ends of the portions 10*a*, 10*b* are configured to be in contact with each other, the contact can be such that airfoil vibration results in at least some relative movement of the portions 10, 10*b*. In an exemplary embodiment, shown in FIG. 1, this can be achieved by the portions 10*a*, 10*b* being configured as "snubbers" that extend from a point part way along the radial height RD of the airfoils 2*a*, 2*b*. In an exemplary embodiment this can be achieved by the portions 10 extending from a radial end of the airfoils 2*a*, 2*b* so as to form airfoil tip shrouds.

Figure 2:
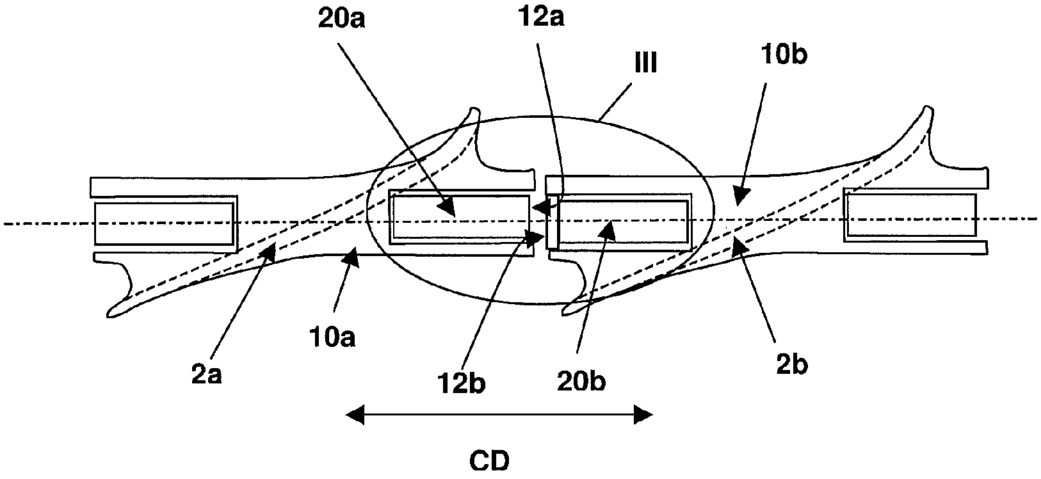
FIG. 2 is a cross section view through II-II of the adjacent airfoils of FIG. 1 showing an exemplary vibration damping system.
Figure 3:
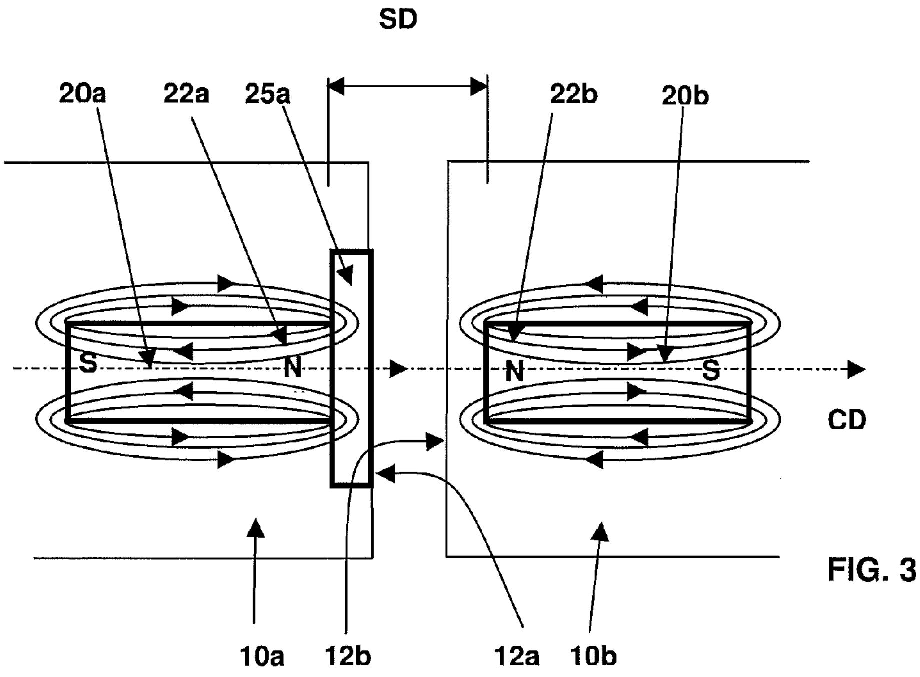
FIG. 3 is an expanded view of section III of FIG. 2 showing features of an exemplary vibration damping system.
Figure 4:
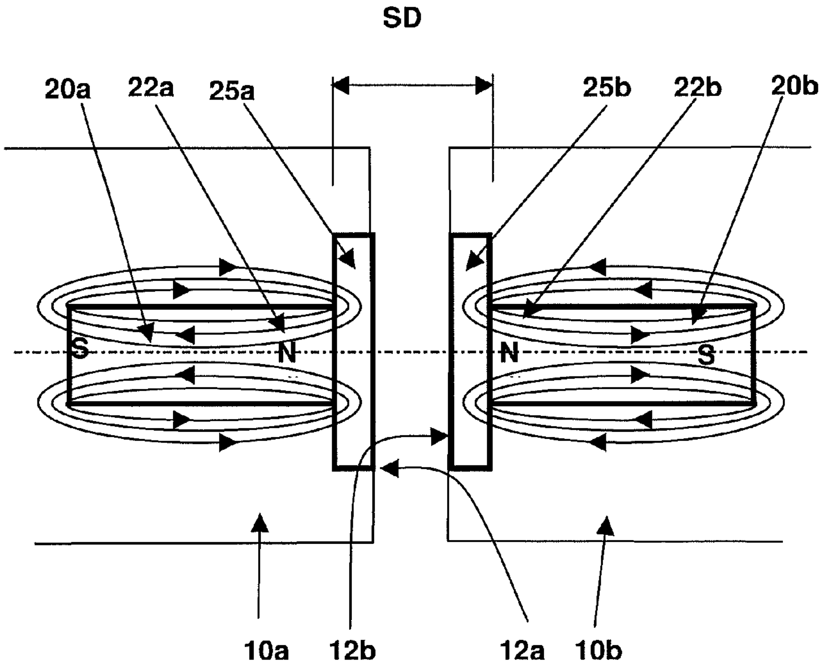
FIG. 4 is an expanded view of section III of FIG. 2 showing features of another exemplary vibration damping system.

FIG. 2 shows a cross-sectional view of the airfoils 2*a*, 2*b* along line II-II of FIG. 1 showing paired portions 10*a*, 10*b* that form an exemplary vibration damping system. Further expanded views of exemplary portions 10*a*, 10*b* are shown in FIGS. 3 and 4. In FIG. 2 the exemplary vibration damping system includes two paired portions, paired by proximity and interaction. Each portion 10*a*, 10*b*, in one exemplary embodiment, extends substantially in the circumferential direction CD from adjacent airfoils 2*a*, 2*b*, to distal ends that form faces 12*a*, 12*b*. The pairing, in one exemplary embodiment, is such that faces 12*a*, 12*b* of the portions 10*a*, 10*b* are substantially parallel and in close proximity to, or in contact with each other, and substantially perpendicular to the circumferential direction CD. Each portion 10*a*,10*b* fixingly receives a magnet 20*a*, 20*b* with a pole 22*a*, 22*b* such that vibrations of the airfoils 2*a*, 2*b* can be mirrored by movement of the magnets 20*a*, 20*b*. Other known airfoil features such as shrouds (not shown) mounted on radially distal ends and extending between adjacent airfoils 2*a*, 2*b* may also perform the function of the exemplary fixing and receiving portions 10*a*, 10*b*. The magnets 20*a*, 20*b* can be configured and arranged, in an exemplary embodiment, so that poles 22*a*, 22*b* of received magnets 20*a*, 20*b* of paired fixing and receiving portions 10*a*,10*b* substantially align in the circumferential direction CD such that one pole 22*a*, 22*b* of each magnet 20*a*, 20*b* faces one pole 22*a*, 22*b* of the other magnet 20*a*, 20*b*. Pole 22*a*, 22*b* also faces the face 12*a*, 12*b* of the fixing and receiving portion 10*a*, 10*b* in which it is received. This ensures a stronger and better-aligned magnetic field. The exemplary vibration damping system can include one or more non-magnetic conducting plates 25*a*, 25*b* fixingly mounted between the facing poles 22*a*, 22*b* of the magnets 20*a*, 20*b*, as shown in FIGS. 3 and 4.

FIG. 3 shows an exemplary embodiment in which magnets 20*a*, 20*b* are located in fixing and receiving portions 10*a*, 10*b* of adjacent airfoils 2*a*, 2*b* so as to form an exemplary vibration damping system. Each of the fixing and receiving portions 10*a*, 10*b* has a face 12*a*, 12*b* which, in an exemplary embodiment, is substantially parallel to the face 12*a*, 12*b* of a fixing and receiving portion 10*a*, 10*b* of an adjacent airfoil 2*a*, 2*b*. The proximity of the faces 12*a*, 12*b* pair the fixing and receiving portions 10*a*, 10*b*. In an exemplary embodiment, each of the magnets 20*a*,20*b* are aligned in the paired portions 10*a*, 10*b*, in the same circumferential direction CD. The arrangement is such that one pole 22*a*, 22*b* of each magnet 20*a*, 20*b* faces the pole 22*a*, 22*b* of another magnet 20*a*, 20*b*, so as to align the poles 22*a*, 22*b*, while they face the face 12*a*, 12*b* of the fixing and receiving portion 10*a*,10*b* in which they are received. In this way relative movement of magnets 20*a*, 20*b* mirrors movement induced by airfoil vibration while mutual attraction or rejection of the magnets 20*a*, 20*b* can result in a stiffening of the adjacent airfoils 2*a*, 2*b* causing a resistance to that vibration.

Between the face 12*a* of one fixing and receiving portion 10*a* and a pole 22*a* of the magnet 20*a* received in that receiving portion 10*a*, an exemplary embodiment has a mounted non-magnetic conducting plate 25*a*. The mounting can be such that the location and position of the non-magnetic conducting plate 25*a* is fixed relative to the magnet 20*a* such that vibration does not change the relative location between the non-magnetic conducting plate 25*a* and the magnet 20*a*.

The non-magnetic and conducting nature of the non-magnetic conducting plates 25*a* results in the formation of eddy currents in the non-magnetic conducting plate 25*a* when the magnet 20*b* in the paired fixing and receiving portion 10*b* moves relative to the non-magnetic conducting plate 25*a*. These eddy currents result in a resistance to movement that can result in damping of vibration.

FIG. 4 shows an exemplary embodiment in which magnets 20*a*, 20*b* are located in fixing and receiving portions 10*a*, 10*b* of adjacent airfoils 2*a*, 2*b* so as to form an exemplary vibration damping system. Each of the fixing and receiving portions 10*a*, 10*b* has a face 12*a*, 12*b* which can be substantially parallel to the face 12*a*, 12*b* of a fixing and receiving portion 10*a*, 10*b* of an adjacent airfoil 2*a*, 2*b* by forming paired fixing and receiving portions 10*a*, 10*b*. Each of the magnets 20*a*, 20*b* can be aligned in the paired portions 10*a*, 10*b*. In the exemplary embodiment shown, the portions 10*a*, 10*b* extend in the circumferential direction CD although other arrangements are possible. The alignment is such that one pole 22*a*, 22*b* of each magnet 20*a*, 20*b* faces the pole 22*a*, 22*b* of another magnet 20*a*, 20*b*, so as to align the poles 22*a*, 22*b*, while they face the face 12*a*, 12*b* of the fixing and receiving portion 10*a*, 10*b* in which they are received. In this way relative movement of magnets 20*a*, 20*b* mirrors movement induced by airfoil vibration while mutual attraction or rejection of the magnets 20*a*, 20*b* results in a stiffening of the adjacent airfoils 2*a*, 2*b* causing a resistance to that vibration.

Non-magnetic conducting plates 25*a*, 25*b* are fixingly mounted between the faces 12*a*, 12*b* of each fixing and receiving portions 10*a*, 10*b* and a pole 22*a*, 22*b* of a magnet 20*a*, 20*b* within that portion 10*a*, 10*b*. For example, in the circumferential direction, extending from an airfoil 2*a*, 2*b*, each portion 10*a*, 10*b* has a received magnet 20*a*, 20*b*, a mounted non-magnetic conducting plate 25*a*, 25*b* and a face 12*a*, 12*b*. The mounting of the non-magnetic conducting plate 25*a*, 25*b* for each portion 10*a*, 10*b* can be such that the location and position of the non-magnetic conducting plate 25*a*, 25*b* may be fixed relative to the magnet 20*a*, 20*b* received in that portion 10*a*, 10*b*, independent of vibration.

The non-magnetic and conducting nature of the non-magnetic conducting plate 25*a*, 25*b* results in the formation of eddy currents in the non-magnetic magnetic conducting plate 25*a*, 25*b* when the magnet 20*a*, 20*b* located in the paired fixing and receiving portion 10*a*, 10*b* moves relative to the non-magnetic conducting plate 25*a*, 25*b* due to vibration. This results in a resistance to movement resulting in vibration damping. As non-magnetic conducting plates 25*a*, 25*b* are located in both paired portions 10*a*, 10*b* the damping effect, compared to an arrangement with one non-magnetic conducting plate 25*a*, 25*b*, can be increased.

Figure 5:
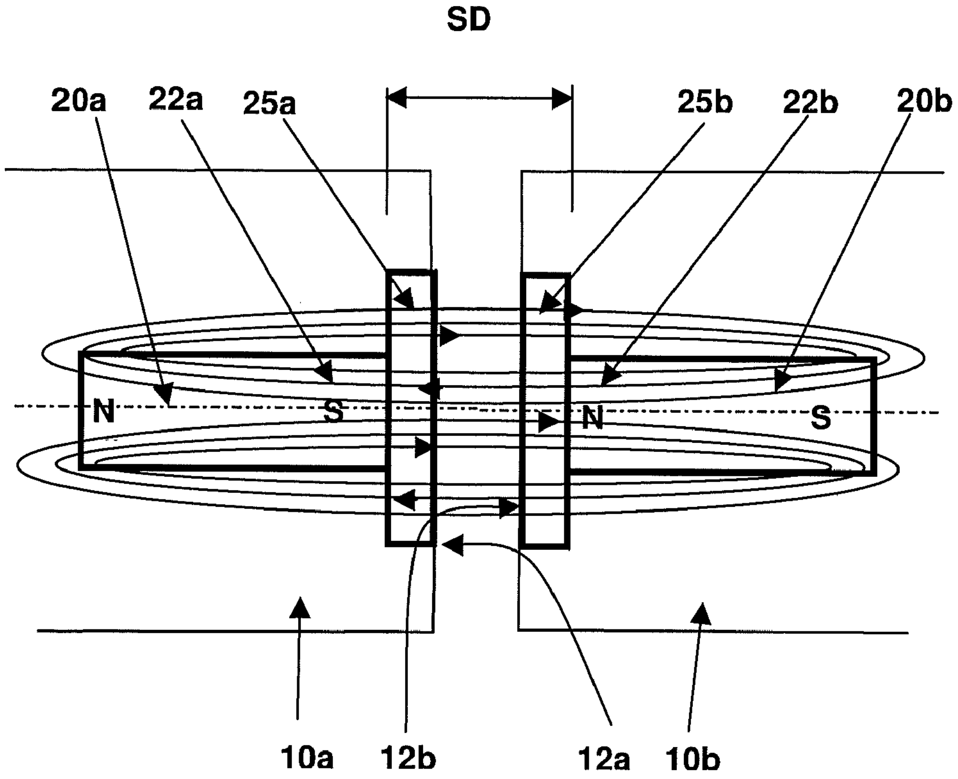
FIG. 5 is an expanded view of section III of FIG. 2 showing an exemplary arrangement where the polarity of facing magnetic poles are different.

FIG. 5 shows an exemplary embodiment of a damping system that differs from that shown in FIGS. 3 and 4 by the fact that the facing poles 22*a*, 22*b* of the magnets 20*a*, 20*b* have different polarity. While a non-magnetic conducting plate 25*a*, 25*b* is shown in each portion 10*a*, 10*b*, in an exemplary embodiment, only one of the portions 10*a*, 10*b* can have a non-magnetic conducting plate 25*a*, 25*b*.

It was found for an arrangement including two adjacent airfoils 2*a*, 2*b* fitted with exemplary embodiment of a damping system, the best vibration damping performance for a range of vibrational frequency can be achieved when the magnets 20*a*, 20*b* of the paired portions 10*a*, 10*b* are separated. However, as interaction of magnets 20*a*, 20*b* decreases with distance, there is an optimum distance. It is assumed that this improved performance would also apply for cyclically symmetric systems where a plurality of airfoils with exemplary embodiments of a damping system is circumferentially mounted. The optimum separation distance SD, of between 7-10 mm determined for one experimental two airfoil 2*a*, 2*b* system can be expected to be reduced to between 1-5 mm for a multiple circumferential mounted airfoil 2*a*, 2*b* arrangement.

The higher the conductivity of the non-magnetic conducting plates 25*a*, 25*b*, the stronger the eddy currents created by relative movement between the plates 25*a*, 25*b* and magnets 20*a*, 20*b* and therefore the greater the resilience to vibration. Therefore, in one exemplary embodiment the non-magnetic conducting plates 25*a*, 25*b* can be made of material with an electrical conductivity of greater than $35\times10^{6}$ $S\cdot m^{-1}$ measured at 20° C. In another exemplary embodiment, the non-magnetic conducting plates 25*a*, 25*b* can be made of either or both aluminium and/or copper.

Although the disclosure has been herein shown and described by way of exemplary embodiments, it will be appreciated by those skilled in the art that the present disclosure can be embodied in other specific forms without departing from the spirit or essential characteristics thereof. For example, while the exemplary embodiments show only one paired fixing and receiving portions 10*a*, 10*b* per adjacent airfoils 2*a*, 2*b*, the airfoils 2*a*, 2*b* could be fitted with more than one paired portions 10*a*, 10*b* at the same and/or different radial heights RD. The presently disclosed embodiments are therefore considered in all respects to be illustrative and not restricted.

REFERENCE NUMBERS

2*a*, 2*b* Airfoils
10*a*, 10*b* Snubber (exemplary fixing and receiving portion)
12*a*, 12*b* Face
20*a*, 20*b* Magnet
22*a*, 22*b* Magnetic pole
25*a*, 25*b* Non-magnetic conducting plate
CD Circumferential direction
RH Radial height
SD Separation Distance

What is claimed is:

1. A vibration damping system for adjacently mounted circumferential distributed turbo machine airfoils, the system comprising:

a first fixing and receiving portion, configured to extend from a first airfoil to an end defining a first face;

a second fixing and receiving portion configured to extend towards the first fixing and receiving portion to establish an end defining a second face proximal with the first face of the first fixing and receiving portion;

a first magnet, fixed in the first fixing and receiving portion and arranged such that a pole faces towards the first face of the first fixing and receiving portion;

a first non-magnetic conducting plate mounted between the first face and the first magnet; and a second magnet, fixed in the second fixing and receiving portion and arranged such that a pole which faces the second face is aligned with, and separated by a separation distance from the pole of the first magnet.

2. The vibration damping system of claim 1 wherein the poles of the first and second magnets which face one another have opposite polarities.

3. The vibration damping system of claim 2, wherein the first magnet and the second magnet are separated by a distance of between 1 mm and 5 mm.

4. The vibration damping system of claim 3, wherein the second fixing and receiving portion has a second non-magnetic conducting plate mounted between the second magnet and the second face, wherein the first non-magnetic conducting plate and the second non-magnetic conducting plate are made of a material with an electrical conductivity of greater than $35\times10^6$ S·m$^{-1}$ measured at 20° C.

5. The vibration damping system of claim 2, wherein the second fixing and receiving portion has a second non-magnetic conducting plate mounted between the second magnet and the second face, wherein the first non-magnetic conducting plate and the second non-magnetic conducting plate are made of a material with an electrical conductivity of greater than $35\times10^6$ S·m$^{-1}$ measured at 20° C.

6. The vibration damping system of claim 1 wherein the second fixing and receiving portion has a second non-magnetic conducting plate mounted between the second magnet and the second face.

7. The vibration damping system of claim 6, wherein the first non-magnetic conducting plate and the second non-magnetic conducting plate are made of a material with an electrical conductivity of greater than $35\times10^6$ S·m$^{-1}$ measured at 20° C.

8. The vibration damping system of claim 6, wherein the first magnet and the second magnet are separated by a distance of between 1 mm and 5 mm.

9. The vibration damping system of claim 6, wherein the first non-magnetic conducting plate and the second non-magnetic conducting plate are made of a material with an electrical conductivity of greater than $35\times10^6$ S·m$^{-1}$ measured at 20° C.

10. The vibration damping system of claim 1, wherein the first magnet and the second magnet are separated by a distance of between 1 mm and 5 mm.

11. The vibration damping system of claim 10, wherein the second fixing and receiving portion has a second non-magnetic conducting plate mounted between the second magnet and the second face, wherein the first non-magnetic conducting plate and the second non-magnetic conducting plate are made of a material with an electrical conductivity of greater than $35\times10^6$ S·m$^{-1}$ measured at 20° C.

12. The vibration damping system of claim 1, wherein the first face and the second face are in contact with one another.

13. A turbo machine comprising:

a first airfoil and a second airfoil; and a vibration damping system which includes:

- a first fixing and receiving portion, configured to extend from within the first airfoil to an end defining a first face;
- a second fixing and receiving portion configured to extend from within the second airfoil towards the first fixing and receiving portion to establish an end defining a second face proximal with the first face of the first fixing and receiving portion;
- a first magnet, fixed in the first fixing and receiving portion and arranged such that a pole faces towards the first face of the first fixing and receiving portion;
- a first non-magnetic conducting plate mounted between the first face and the first magnet; and
- a second magnet, fixed in the second fixing and receiving portion and arranged such that a pole which faces the second face is aligned with, and separated by a separation distance from the pole of the first magnet.

14. The vibration damping system of claim 13, wherein the first face and the second face are in contact with one another.

* * * * *